United States Patent Office 3,081,676
Patented Mar. 19, 1963

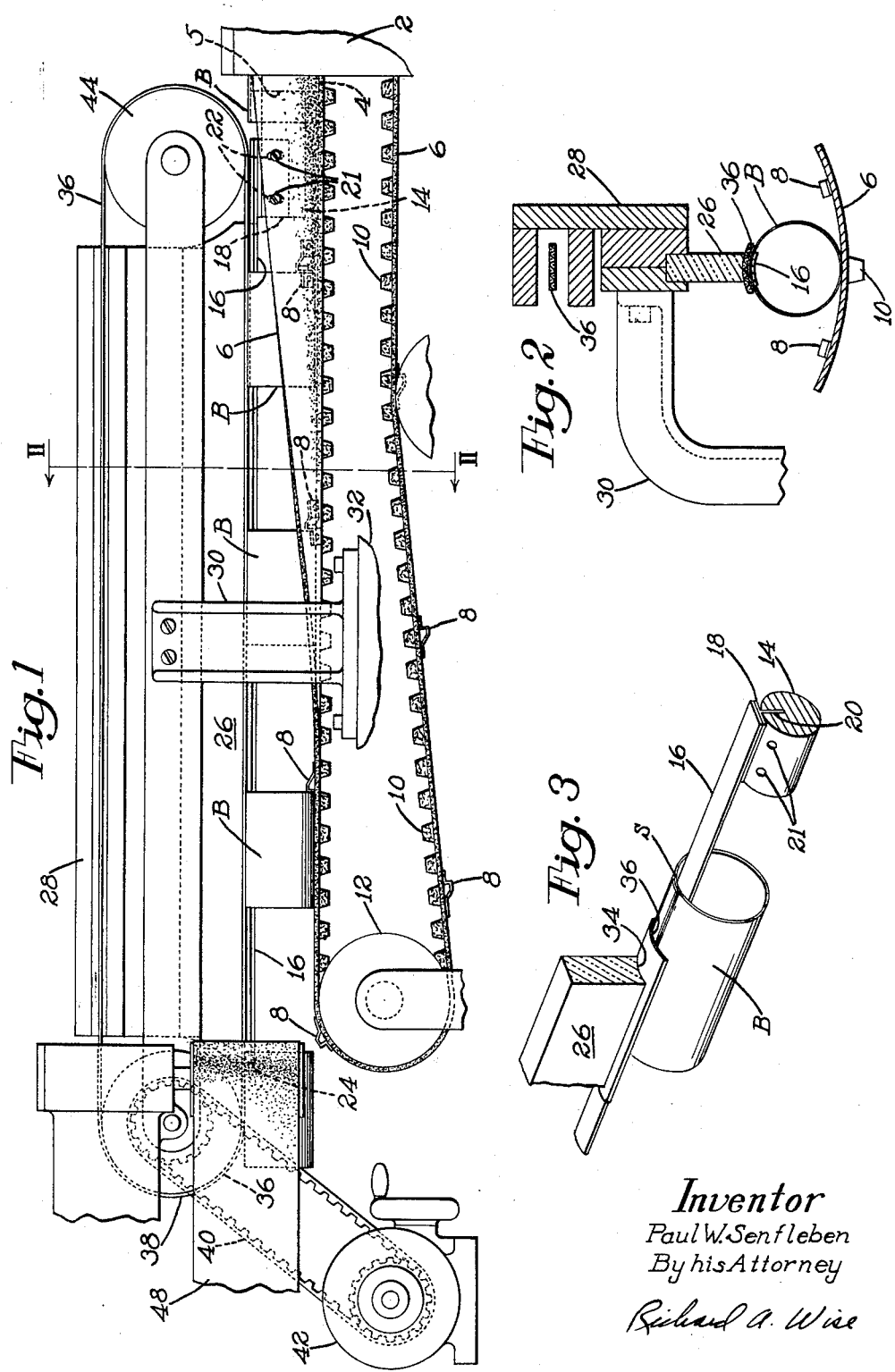

3,081,676
APPARATUS FOR FORMING CONTAINERS
Paul W. Senfleben, Beverly, Mass., assignor to Safe-Pack Container Co., Minneapolis, Minn., a corporation of Minnesota
Filed Jan. 18, 1961, Ser. No. 83,414
3 Claims. (Cl. 93—82)

This invention relates to apparatus for forming tubular container bodies. In United States Letters Patent No. 2,915,952, issued December 8, 1959 to J. G. O'Neil there is disclosed a machine for forming a continuous moving procession of tubular container bodies by progressively folding flexible blanks about an elongated mandrel. The blanks which are flat rectangular sheets are moved by a driven flexible belt lengthwise of the mandrel and gradually wrapped around the mandrel with their edge portions overlapped to form longitudinal side seams. The seams are secured by any suitable adhesive, which, in the patent, is disclosed as a heat responsive lacquer. After the edges have been overlapped and secured, the closed tubular container bodies leave the mandrel and continue to the next work station while the lacquer cools and sets.

One of the problems incurred in operating this type of machine at high speeds is that little time is available for the cement or adhesive to set after the seam has been formed. Also when different types of adhesives are employed, as for example, the newer thermo-responsive, waterproof cements, somewhat greater time is required for the adhesives to set than with lacquer. Because the flexible belt which wraps the blanks about the mandrel becomes disengaged from the bodies shortly after the seams have been secured, if the adhesive has not then set, there is a tendency for the bodies to spring open at the seams unless means are provided for applying continuous pressure. It is to the solution of these problems that the present invention is directed.

One of the objects of this invention is to provide in a tubular body maker means for applying pressure to the overlapping seam portions of closed tubular container bodies after adhesive has been applied to the seams.

Another object of this invention is to provide inexpensive means for applying continuous pressure to overlapping seams of closed tubular bodies which means are readily adaptable for use with existing body makers.

An obvious solution would be to apply pressure to the outside of the body seams by an external pressure bar, or the like, after the bodies leave the control of the forming belt. This would, however, require the mandrel to be lengthened substantially to provide external support, entailing considerable expense. If the mandrel were not lengthened, any external pressure would not only compress the seams but deform the entire tubular bodies as well.

Accordingly, another object of the invention is to provide inexpensive means for applying pressure to the overlapping seams of closed tubular bodies which acts directly upon the seams simultaneously from the inside and outside of the bodies without distorting the remaining portions of the bodies and without requiring additional mandrel structure.

As a feature of this invention, there is provided simple pressure applying mechanism which is readily adaptable for use with existing tubular body makers comprising a flexible ferro-magnetic tape which is joined to the terminal end of the mandrel so that the closed bodies will pass freely onto the tape. Since the seams are formed at the upper side of the mandrel, the tape is located as a substantial continuation of that upper side so that the overlapping seam will be engageable in direct longitudinal alignment with the tape. Slightly above the tape and in direct alignment with it is a magnet either of the permanent or electro-magnetic type which attracts the tape toward it. The bodies pass between the tape and the magnet and their seams are thus ironed or pressed between the two. The terminal end of the tape is free whereby after the bodies have moved from beneath the magnet they pass uninterrupted from the tape ready to be engaged by conveying mechanism leading to subsequent operating stations of the machine. Thus, is provided means for applying pressure directly to the seams simultaneously from the inside and outside of the tubular bodies without distorting the remaining portion of the bodies.

As disclosed in the above-identified O'Neil patent the flexible forming belt which wraps the blanks about the forming mandrel becomes disengaged from the bodies near the terminal end of the mandrel and thereby no longer is effective to convey the bodies along the ferro-magnetic pressure applying tape. This could be remedied by lengthening the belt so that it maintains control of the bodies after they have left the mandrel and while they are passing beneath the magnet but this would require substantial redesign of existing body makers.

Accordingly, another object of this invention is to provide inexpensive supplemental conveying mechanism to move the bodies between the tape and the magnet.

Still another object is to provide supplemental conveying mechanism to move the bodies between the tape and the magnet which mechanism may be used with current flexible-belt body makers without requiring substantial modification of the existing equipment.

In accordance with these objects, another feature of this invention is the provision of an endless power driven flexible nonferro-magnetic belt mounted relatively to the magnet and tape to pass beneath the magnet in engagement with the upper surface of the lap seams of the bodies. The belt and the seams are pressed firmly into engagement by the magnetic forces drawing the tape toward the magnet. Frictional engagement between the conveying belt and the can body is sufficient to move the body over the tape after the bodies have become disengaged from the forming belt and mandrel. Varying the thickness of the belt results in the tape being maintained at greater or lesser distances from the magnet resulting in greater or lesser pressures applied by the seams.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings,

FIG. 1 is a side elevation of a magnetic pressure applying device embodying the invention;

FIG. 2 is a sectional view taken along the line II—II of FIG. 1; and,

FIG. 3 is a perspective view with parts broken away showing a container body having its overlapping side seam being compressed by the illustrative mechanism.

Referring to FIG. 3, there is shown a tubular container body B of the type made in the above-identified O'Neil body maker. The tubular body B has a substantially cylindrical cross section with a longitudinal lap seam S formed by overlapping the edge portions of a flexible rectangular blank. The interface of the seam S is secured by any desired adhesive. Reference may be had to the O'Neil patent for details of the construction of the body maker 2, only a portion of which is shown at the right-hand side of FIG. 1. Briefly, a continuous procession of rectangular blanks are bent about a mandrel 4 by a continuously driven flexible forming belt 6 which is deflected around the mandrel 4. The belt is provided with a plurality of lugs 8 which engage the trailing edges of the blanks from which the bodies B are made to move them from right to left along the mandrel. The belt is driven by a sprocket drive, not shown, which engages teeth 10 located on the side of the belt opposite the lugs 8. The belt passes around a sprocket wheel 12 before passing back into the body maker 2. It will be noted that after the belt 6 has left the body maker 2 it gradually becomes flattened out prior to passing around the sprocket 12 and as seen in FIG. 2, the lugs are no longer in engagement with the trailing edge of the container bodies B.

The terminal end 5 of the forming mandrel 4 (right-hand side of FIG. 1) is provided with a co-axial projection 14 which mounts a flexible ferro-magnetic tape 16 inwardly of the sheet engaging surface of the mandrel. The tape is secured to the upper surface of a T-shaped mounting bracket 18 (FIG. 3), the lower leg 20 of which is slidably mounted in the projection 14. A pair of locking screws 21 are threaded in the projection 14 and pass through vertical slots 22 in the leg 20 of the bracket 18 to permit its heightwise adjustment. The ferro-magnetic tape 16 is a substantial continuation of the upper side of the mandrel 4 and extends toward the left, its terminal end 24 being unmounted.

A magnet 26 which may be either of a permanent or electro-magnetic type is mounted in an appropriate housing 28 in direct longitudinal alignment with the tape 16. The housing 28 is secured by a bracket 30 to a portion of the machine frame 32. The lower edge of the magnet 26 is curved as shown at 34 (FIG. 3) to conform to the configuration of the tubular bodies.

A flexible fibrous conveyor belt 36 of non-magnetic material is mounted on the machine passing around a drum 38 which is driven by a belt 40 deriving its power from any convenient means, such as an electric motor 42, the speed of which is able to be adjusted. The right-hand end of the conveyor belt 36 passes around an idler drum 44. The lower half of the belt passes directly beneath the magnet 26 and is engageable with the outside of the lapped seam S of the can bodies B. The conveyor belt 36 is driven at the same linear speed as the tubular body forming belt 6. After passing from beneath the left-hand end of the magnet 26 the can bodies are engaged by vertical power driven conveyor belts 48, only one of which is shown in FIG. 1, which conducts them to subsequent stations of the machine where they are capped and filled.

In operation, the bodies are formed in the body maker 2 by being wrapped by the flexible belt 6 around the forming mandrel 4 where the lap seams are formed and cemented. The then closed tubular bodies pass from the terminal end 5 of the mandrel still under the control of the lugs 8 of the forming belt 6 moving in an uninterrupted fashion over the right-hand end of the ferromagnetic tape 16 where it is joined to the mandrel projection 14. At this point the seams S of the closed container bodies are engaged by the flexible belt 36 which is moving at the same linear speed as the forming belt 6. Thereafter, the seams S of the closed bodies B pass beneath the magnet 26, their inner portions riding directly over the ferro-magnetic tape 16 which, as seen in FIG. 2, conforms to the configuration of the inside of the body as it is attracted by the magnet 26. The conveyor belt 36 likewise conforms to the configuration of the body and the curved lower surface 34 of the magnet. The frictional engagement by the conveyor belt 36 against the can bodies is sufficient to draw the bodies over the tape 16. The magnetic force attracts the tape 16 compressing the seams S between the tape 16 and the belt 36 which is backed up by the rigidly mounted magnet 26. This compressing or ironing process, as it may also be called, assures that the seams are firmly held together during the time that the adhesive sets without distorting the remaining portion of the bodies. The ferro-magnetic tape 16 being unmounted at its left-hand end permits the bodies to pass freely from beneath the magnet into the control of the vertical conveyor belts 48.

Having thus described my invention, what I claim as new and desire to secure by Letters Patent of the United States is:

1. In a machine for forming a continuously moving procession of closed, discrete tubular bodies with longitudinal adhesively secured lap seams, means for applying pressure to said seams while the adhesive sets comprising a flexible ferromagnetic tape simultaneously engageable with the seams of at least two discrete bodies on the inside of said closed bodies, an elongated magnet aligned with the tape outside the path of movement of the bodies, an endless belt of flexible non-magnetic material movable lengthwise between the magnet and the tape and simultaneously engageable with the seams of at least two discrete bodies on the outside of the bodies, and power means for driving said endless belt, whereby the magnet attracts the tape to apply pressure to the seams and to urge the belt frictionally against the seams and whereby said endless belt moves the bodies relatively to said magnet and said tape.

2. In a machine for forming closed tubular bodies with adhesively secured lap seams having a forming mandrel, a flexible belt adapted to move discrete flexible sheets lengthwise of the mandrel and wrap them about the mandrel into tubular shape with their edge portions in overlapping relation, and pressure means for adhesively joining said overlapping portions to form discrete closed tubular bodies with longitudinal lap seams, second pressure means comprising a ferro-magnetic tape flexible throughout its length and adjustably secured to the end of the mandrel inwardly of its sheet engaging surface, said tape being simultaneously engageable with at least two discrete bodies on the inner surfaces of the lap seams as said tubular bodies leave the mandrel, an elongated magnet aligned with the tape outside the path of movement of the outer surfaces of the lap seams of the bodies to attract said tape, and an endless belt simultaneously engageable with at least two of said discrete bodies for moving the bodies lengthwise of the magnet with their seams pressed between said tape and magnet, whereby said second pressure means continues the action of the first-mentioned pressure means in compressing the adhesively joined seams.

3. In a machine for forming closed tubular bodies with adhesively secured lap seams having a forming mandrel, a flexible belt adapted to move flexible sheets lengthwise of the mandrel and wrap them about the mandrel into tubular shape with their edge portions in overlapping relation, and means cooperating with the mandrel for adhesively joining said overlapping portions to form closed tubular bodies with longitudinal lap seams, pressure applying means comprising a ferromagnetic tape, means on the end of the mandrel inwardly of its sheet engaging surface adjustably mounting said tape thereon as a continuation of the mandrel, said tape being engageable with the inner surfaces of the longitudinal lap seams as the closed tubular bodies leave the mandrel, an elongated magnet aligned with the tape outside the path of movement of the bodies to attract said tape, a second driven endless belt of flexible non-magnetic material movable lengthwise between the magnet and the tape and engageable with the seams on the outside of the bodies to move the bodies lengthwise of the magnet after said first-mentioned belt moved them lengthwise of the mandrel, and power means for moving said second belt at the same linear speed as said first-mentioned belt, whereby the magnet attracts the tape pressing the seams between the tape and the second belt as said second belt moves the bodies relatively to the magnet to compress further the seams initially closed by the joining means.

References Cited in the file of this patent

UNITED STATES PATENTS

| | | |
|---|---|---|
| 2,713,379 | Sisson | July 19, 1955 |
| 2,741,296 | Collins | Apr. 10, 1956 |
| 2,899,875 | Leasure | Aug. 18, 1959 |
| 2,912,043 | Bargholtz et al. | Nov. 10, 1959 |
| 2,915,952 | O'Neil | Dec. 8, 1959 |
| 2,982,334 | Cooper et al. | May 2, 1961 |